(No Model.) 2 Sheets—Sheet 1.
M. I. WELCH.
SAW SHARPENER AND GUMMER.
No. 404,329. Patented May 28, 1889.
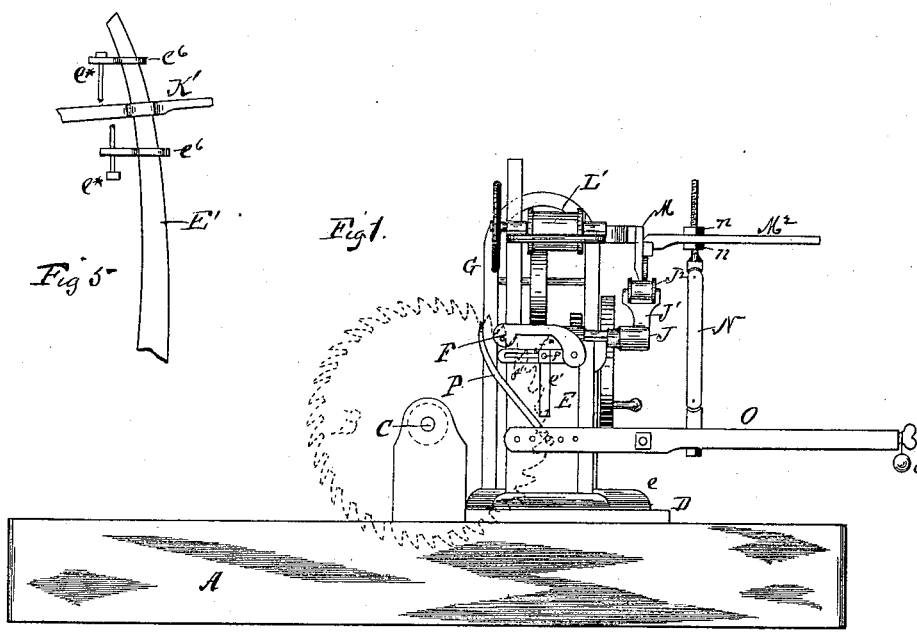
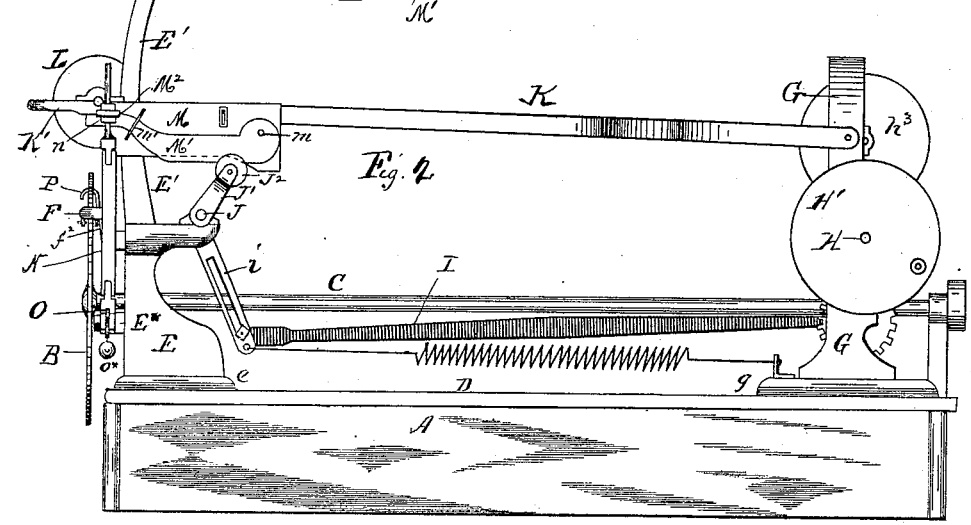
Witnesses:
A. B. Buhrman
Chas. J. Kali
Inventor:
M. I. Welch
By Atty
J. M. Kali
N. PETERS, Photo-Lithographer, Washington, D. C.

(No Model.) 2 Sheets—Sheet 2.

M. I. WELCH.
SAW SHARPENER AND GUMMER.

No. 404,329. Patented May 28, 1889.

Witnesses:
Al. Buhrman
Chas. S. Kalb

Inventor
M. I. Welch
By Atty J. N. Kalb ically, UNITED STATES PATENT OFFICE.

MICHAEL I. WELCH, OF ADEL, GEORGIA, ASSIGNOR OF ONE-HALF TO JOHN L. STUDSTILL, OF SAME PLACE.

SAW SHARPENER AND GUMMER.

SPECIFICATION forming part of Letters Patent No. 404,329, dated May 28, 1889.

Application filed February 9, 1889. Serial No. 299,321. (No model.)

*To all whom it may concern:*

Be it known that I, MICHAEL I. WELCH, a citizen of the United States, residing at Adel, in the county Berrien and State of Georgia, have invented certain new and useful Improvements in Saw Sharpeners and Gummers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to saw sharpeners and gummers, and has for its object the provision of a device of this character which shall possess great nicety of adjustment and be capable of dressing the saw in such a manner as to give the teeth any pitch or hook desired, make the backs rounded or straight, and shape the gullet or throat large or small, as may be desired, without changing the grinding or emery wheel.

The invention consists in the construction and combination of parts hereinafter set forth, and pointed out in the claims.

The accompanying drawings illustrate what I consider the best means for carrying my invention into practice.

Figure 3:
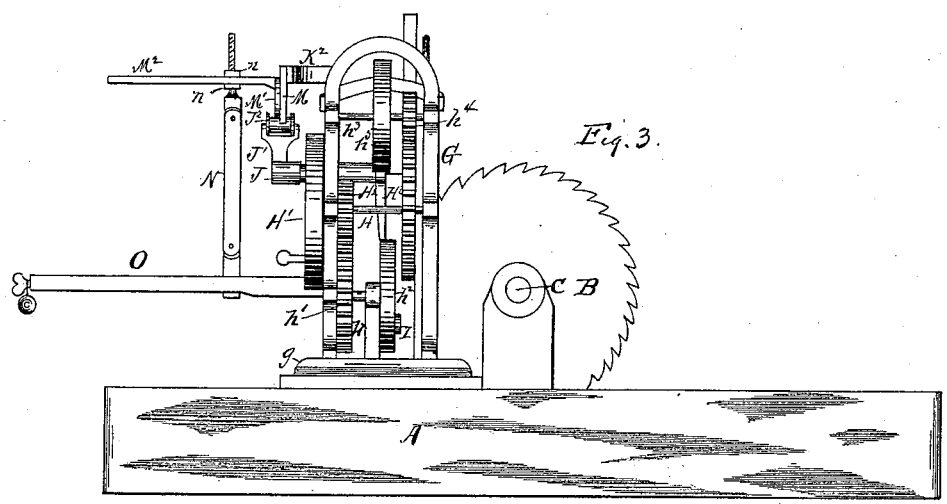
Figure 4:
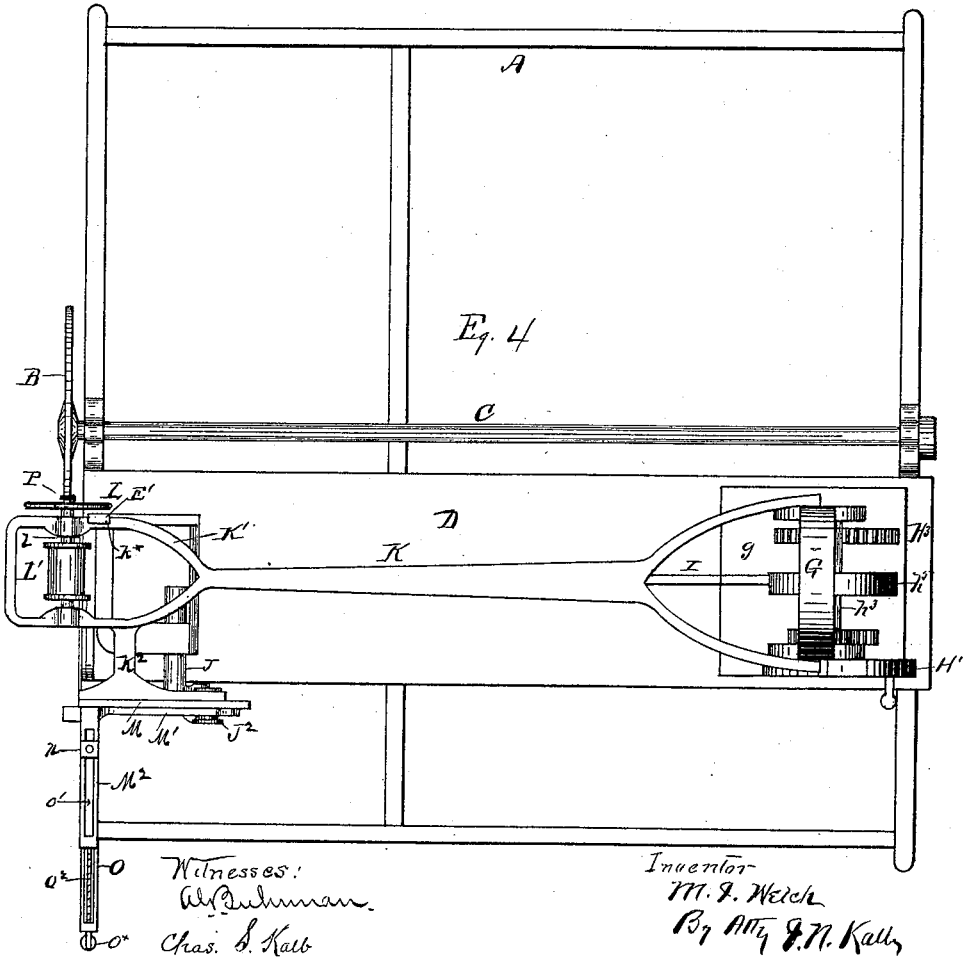

Figure 1 is a front elevation of the device. Fig. 2 is a side elevation of same, looking toward the left in Fig. 1. Fig. 3 is a rear elevation of same, and Fig. 4 is a plan view of same. Fig. 5 is a detail of the steadying-arm. Fig. 6 is a detail of the lifting-board.

Similar letters of reference indicate corresponding parts in all the figures where they occur.

In the drawings I have shown the sharpener and gummer set upon the frame of a circular-saw mill; but it will be understood that the sharpener or gummer is detachable from the frame and capable of use in other situations.

A is a portion of the frame of the saw-mill. B is the saw to be gummed or sharpened, (shown in the drawings in outline by dotted lines only in Fig. 1,) and C is the saw-arbor. The gummer has a base-plate, D, which is clamped or secured upon the frame A in any suitable manner.

At the forward end of the plate or board D is a standard or supporting frame, E, whose base $e$ is bolted to the plate D, and whose front face is provided with a vertical slot, $e'$, through which passes a bolt, $f$, provided with nut $f^*$, which clamps a head, $f'$, to the standard, with liberty for vertical adjustment. The head $f'$ carries a pivoted and forked guide, F, which embraces the edges of the saw and has side pinching or set screws to clamp the saw with any desired tension. One side of the guide rests upon a projection, $f^2$, of the head $f'$, and is thereby supported at a proper height as the saw is rotated rearwardly. By means of the adjustment of the head the guide can be made to fit saws of any diameter.

One side of the standard E is carried up to form or has affixed to it a vertical post, E', which is preferably curved, as shown, and is termed the "steadying-post" from the function it performs, which will be presently explained.

G is a standard-frame, whose base is bolted to the opposite end of base plate or board $g$, and which is formed in the shape of bifurcated and arched standard, between the limbs of which the driving-gears and crank are supported.

H is the main shaft, bearing a pulley or hand-wheel, H', on its end outside of the frame, to which power is applied by hand or by a belt, as may be desired. In a side of the frame the main shaft bears a spur-gear, $H^2$, and at the opposite side a larger gear-wheel, $H^3$.

A counter-shaft, $h$, is supported at one end in one limb of the frame, beneath the main shaft, and at the other in a stud, $h^*$, and bears a gear-wheel, $h'$, meshing into the spur-gear $H^2$, and a crank-wheel, $h^2$, to which a pitman, I, is attached, which is connected at its opposite end to a slotted arm, $i$, of a rocker-shaft, J, which is supported in a bracket or extension, $E^3$, of the standard E, and on its opposite end is provided with a fixed arm, J', which bears a roller, $J^2$, the function of which parts will be presently explained. A second counter-shaft, $h^3$, is mounted in bearings in the frame G above the main shaft, and bears a spur-gear, $h^4$, which meshes into the larger gear-wheel, $H^3$, on main shaft H, and also with a pulley, $h^5$, placed about centrally on it, from which a band extends forward over pulley L′ to drive the grinding or emery wheel.

K is an oscillating arm, which is forked at both ends, the forks on one end embracing the frame G, to which they are pivoted, and those on the opposite end (marked K′) affording a support for the emery-wheel arbor $l$, on which a pulley, L′, is placed between the forks K′, over which the band from the pulley $h^5$ passes and drives the emery-wheel, which is marked L, and which is secured upon the arbor $l$ outside of the forks K′ by means of collars, in the usual way. One of the forks K′ has a recess, $k^*$, which receives the steadying-post E′ and allows the oscillating arm, with its arbor, pulley, emery-wheel, and other attachments, hereinafter to be described, to rise and fall thereupon. The recess is turned up to fit the post very snugly, and thereby hold the arm steady in its movements. Upon an extension, $K^2$, of the arm K is provided a contact-plate, M, which is secured to the face of the extension $K^2$ by means of slots and screw-bolts, by which it can be raised or lowered. The lower edge of the plate rests upon the roller $J^2$, and as the rocker-shaft is operated the plate, with its attached oscillating arm, emery-wheel, arbor, and pulley, is moved up and down, guided by the steadying-post.

Upon the side of the plate is an arm, M′, which is pivoted at $m$ and held in a keeper, $m'$, at the opposite end, with liberty to move up and down within certain limits. The arm M′ projects below the lower edge of the plate, and as the roller $J^2$ is operated by the rock-shaft it will first be raised a short distance without the plate and attached parts, and as the roller is further raised the arm and plate will be elevated together. The arm M′ carries a transverse slotted extension, $M^2$, on its free end, and a jointed rod, N, is adjustably held upon the extension by nuts $n\,n$, threaded upon the rod. At its lower end the rod is connected with the outer end of the feed-bar O in a slot, $o'$, and provided with a screw, $o^2$, by which the lower end of the rod is adjustable in the feed-bar. The feed-bar is pivoted to a bracket, $E^*$, of the standard E, and at its inner end carries a feed-finger, P, which is made of high-grade steel tempered hard, so as not to be worn away by contact with the saw. The feed-finger P is adjustable on the feed-bar toward and from the fulcrum of lever O, so as to suit any-sized saw. Upon the post E′ are provided set-screws $e^*\,e^*$, carried by brackets $e^6\,e^6$, by means of the lower one of which the lowest point of descent of the emery-wheel is regulated, and when desired to operate the emery-wheel at one elevation, as in hand-machines, as will be presently explained, the top screw $e^*$ can be set down upon the oscillating arm to hold it. When the machine is power-driven, the upper screw and bracket are preferably removed. Now, when the machine is in operation and the emery-wheel describing a vastly-multiplied number of revolutions compared to the revolutions of the crank-wheel, the saw-tooth in place before the emery-wheel will be ground sharp, and the movement of the roller will raise the arm M′, thus causing the feed-lever to be moved before the emery-wheel is thrown up out of the throat of the tooth, and the movement of the feed-lever will slightly move the saw, so that the throat of the tooth will be ground out wider before the emery-wheel is elevated. Then, as the roller M′ is further moved, the plate M is reached, and it, with the oscillating arm and emery-wheel, is gradually elevated, while at the same time the feed of the saw is progressed by the further elevation of the outer end of the feed-lever, and the back of the tooth is ground off. When the movement of the roller $J^2$ permits the plate M to drop with the oscillating arm and emery-wheel, the jointed rod N bends on its joints and permits easy movement, while the outer end of the feed-lever is drawn down by a suitable weight, $o^*$. This operation is repeated at the sharpening of each tooth.

When it is desired to run the device by hand, the spur $h$ on main shaft is slipped out of engagement with gear H on counter-shaft, the pitman disconnected from arm on rocker-shaft, and a spring, Q, connected to bottom of said arm at one end and connected to a stud at the opposite end by a nut, $q$, which can be made to give it proper tension, the top stop or screw $e^*$ on steadying-post adjusted, and the feed-finger P disconnected from the saw, and the machine may be used and operated by hand; but of course there will be no automatic feed nor oscillation of the emery-wheel.

Having thus described my invention, what I claim, and desire to secure by Letters Patent, is—

1. The combination of a continuously-rotating emery-wheel, an oscillating frame or arm in which it is carried, a fixed plate attached to the frame or arm, an arm or plate pivoted at one end to the fixed plate and extending below the lower edge thereof, and a rocker-shaft and crank operating against the lower edge of the plates, substantially as set forth.

2. The combination of an oscillating arm, an emery-wheel carried thereby, the rocker-shaft and arm for causing the oscillation of the oscillating arm, a plate secured to the oscillating arm and operated upon by the arm of the rocker-shaft, a pivoted arm attached to and extending below the bottom of the plate, also operated upon by the rocker-shaft, a feed-lever connected to the pivoted arm, and a feed-finger connected to the lever for moving the saw in the manner hereinbefore set forth while the emery-wheel is being revolved, as set forth.

3. The combination of an oscillating arm, a side plate fixed to the free end thereof, a plate pivoted to the fixed plate at one end and held in a guide at the other and projecting beneath the lower edge of the said fixed plate, an arbor carried by the free end of the oscillating arm, an emery-wheel mounted in said arbor, a rocker-shaft mounted beneath the oscillating arm, having a roller-crank for operating on the lower edge of the plates, a pivoted feed-lever having a hook for feeding the saw, and connections from the pivoted plate to the feed-lever, as and for the purpose set forth.

4. The combination of the double-arched standard bearing the main shaft-gears, the crank and pulley, arranged as described, the oscillating arm carrying the emery-wheel, arbor, and pulley, the steadying-post on which it is guided, the rocker-shaft having a slotted arm connected to the crank by a pitman which is detachable from the arm, and a roller-arm, a plate on the oscillating arm, under which the roller operates, a pivoted arm carrying the slotted extension, also resting upon the roller, the jointed rod, and the feed-lever, all substantially as and for the purpose set forth.

In testimony whereof I affix my signature in presence of two witnesses.

MICHAEL I. WELCH.

Witnesses:
H. L. ANDERSON,
A. H. LANE, Jr.